(12) United States Patent
Huang

(10) Patent No.: US 12,551,004 B2
(45) Date of Patent: Feb. 17, 2026

(54) TOOTHBRUSH WITH DETACHABLE BRUSH HEAD

(71) Applicant: Shou-Jen Huang, Taoyuan (TW)

(72) Inventor: Shou-Jen Huang, Taoyuan (TW)

( * ) Notice: Subject to any disclaimer, the term of this patent is extended or adjusted under 35 U.S.C. 154(b) by 344 days.

(21) Appl. No.: 18/036,926

(22) PCT Filed: Nov. 20, 2020

(86) PCT No.: PCT/CN2020/130348
§ 371 (c)(1),
(2) Date: May 15, 2023

(87) PCT Pub. No.: WO2022/104675
PCT Pub. Date: May 27, 2022

(65) Prior Publication Data
US 2023/0413981 A1     Dec. 28, 2023

(51) Int. Cl.
*A46B 5/00*          (2006.01)
*A46B 9/04*          (2006.01)

(52) U.S. Cl.
CPC .............. *A46B 5/0095* (2013.01); *A46B 9/04* (2013.01); *A46B 2200/1066* (2013.01)

(58) Field of Classification Search
CPC ......... A46B 5/0095; A46B 7/042; A46B 7/04; A46B 9/04; A61C 17/222; A61C 17/225
USPC ....................... 15/176.5–176.6; 403/326, 329
See application file for complete search history.

(56) References Cited

U.S. PATENT DOCUMENTS

| | | | | |
|---|---|---|---|---|
| 1,600,975 | A | * | 9/1926 | Calkins .................... A46B 7/04 403/329 |
| 2,501,940 | A | * | 3/1950 | Hibbard ................ A47J 45/071 403/329 |
| 3,072,938 | A | * | 1/1963 | Phaneuf ................. A61C 17/32 24/615 |
| 5,875,510 | A | * | 3/1999 | Lamond ............... A46B 5/0095 15/176.6 |
| 2002/0162180 | A1 | | 11/2002 | Blaustein et al. |
| 2018/0325251 | A1 | * | 11/2018 | Lin ....................... A46B 5/0095 |

FOREIGN PATENT DOCUMENTS

| | | |
|---|---|---|
| CN | 106132243 A | 11/2016 |
| CN | 205882303 U | 1/2017 |
| CN | 206282204 U | 6/2017 |

(Continued)

*Primary Examiner* — Laura C Guidotti
(74) *Attorney, Agent, or Firm* — Demian K. Jackson; Jackson IPG PLLC

(57) ABSTRACT

The toothbrush according to the invention includes a handle and a brush head. The handle has a mounting end and a grip end. The handle is formed with a socket extending from the mounting end toward the grip end and further formed laterally with a lateral opening which communicates with the socket. The brush head includes a head portion and an elongated rod connected to the head portion. the head portion is formed at one side with a bristle mounting portion and the elongated rod is adapted for insertion into the socket of the handle. The elongated rod is provided with a snap-fit member adapted to be snapped into the lateral opening. This structural arrangement allows for quick installation of a new brush head to replace the used one without discarding the entire toothbrush, which can be reused and is easy to carry and store.

11 Claims, 5 Drawing Sheets

(56) References Cited

FOREIGN PATENT DOCUMENTS

| | | | | |
|---|---|---|---|---|
| CN | 208676512 U | | 4/2019 | |
| DE | 1212036 B | * | 3/1966 | ............. A46B 13/02 |
| TW | M589035 U | | 1/2020 | |

* cited by examiner

TOOTHBRUSH WITH DETACHABLE BRUSH HEAD

BACKGROUND OF THE INVENTION

1. Field of the Invention

The present invention relates to a toothbrush that allows for replacement of the brush head.

2. Description of Related Art

Oral hygiene is closely related to human health, and people often use tools such as toothbrushes, mouthwash, and dental floss to clean their mouths. Among them, toothbrushes are the basic tool for maintaining oral hygiene due to their convenience. The bristles of a toothbrush can conform to the curvature of the teeth and extend into the interdental area to clean residual food in the interdental area, thus preventing the growth of bacteria in the mouth due to food residues and reducing the occurrence of oral diseases to maintain oral hygiene.

A typical toothbrush includes a brush head and a handle connected to the brush head. A slender rod is formed between the brush head and the handle to facilitate operation in the user's mouth while brushing. Currently, commercially available toothbrushes are mostly made of plastic material and have a lifespan of usually around three months. Due to frequent use and wear and tear of the bristles on the toothbrush, the cleaning efficiency decreases over time. In addition, bacteria residue remains on the toothbrush after each use. Using a toothbrush full of bacteria may actually affect the cleaning effect, especially if the toothbrush is stored in a damp bathroom, which is undoubtedly an excellent place for bacterial growth and reproduction. When faced with replacement, the entire toothbrush needs to be discarded, which not only causes waste of resources but also poses a threat to environmental protection. To address this issue, the related industry has started to develop toothbrushes with replaceable bristles or toothbrushes with a replaceable end mounted with bristles.

SUMMARY OF THE INVENTION

According to the invention, a primary object is to provide a toothbrush that allows for replacement of the brush head.

The toothbrush herein comprises: a handle comprising a mounting end and a grip end, wherein the handle is formed with a socket extending from the mounting end toward the grip end and further formed laterally with a lateral opening which communicates with the socket; a brush head comprising a head portion and an elongated rod connected to the head portion, wherein the head portion is formed at one side with a bristle mounting portion and the elongated rod is adapted for insertion into the socket of the handle; and a snap-fit member adapted to be snapped into the lateral opening, wherein the snap-fit member comprises a resilient tab, a press block and a snap-fit bump, and wherein the resilient tab is provided on the elongated rod and connected at one end to the elongated rod with a connecting end, and the other end of the resilient tab is a free end separated from the elongated rod, and wherein the pressing block protrudes from the resilient tab and resides at the free end, and the snap-fit bump protrudes from the resilient tab and is provided between the connecting end and the free end.

The invention is assembled by engaging the snap-fit bump with the lateral opening of the handle. In the case of replacing the brush head with a new one, the user may simply press the press block to drive the snap-fit bump to move inwardly toward the long rod to disengage it from the lateral opening, thereby detaching the brush head from the handle. This structural arrangement allows for quick installation of a new brush head to replace the used one without discarding the entire toothbrush, which can be reused and is easy to carry and store.

According to the preferred embodiments, the handle comprises a metal body and a plastic body joined together. The socket is located at a corresponding position of the metal body and the plastic body, and the lateral opening is provided laterally on the metal body and the plastic body and communicates with the socket. The metal body is sleeved outside and fixed to the plastic body.

According to the preferred embodiments, the metal body and the plastic body are provided therebetween with a first snap-fit module and a second snap-fit module. The first snap-fit module is adapted to prevent the metal body and the plastic body from separating from each other along an extending direction of the handle. The second snap-fit module serves to prevent the metal body and the plastic body from rotating relative to each other.

According to the preferred embodiments, the first snap-fit module comprises stop edges provided at two ends of the plastic body and adapted to position the metal body between the stop edges at the two ends.

According to the preferred embodiments, the second snap-fit module comprises a through-hole and a positioning pin corresponding thereto.

According to the preferred embodiments, the handle is made of metal material or plastic material.

According to the preferred embodiments, the elongated rod is formed with a flat notch complementary to an interior contour of the socket of the handle, thereby preventing the brush head and the handle from rotating relative to each other.

According to one preferred embodiment, the snap-fit member is provided on the elongated rod at the same side as the bristle mounting portion. According to an alternative preferred embodiment, the snap-fit bump is provided on the elongated rod at a different side from where the bristle mounting portion resides.

DETAILED DESCRIPTION OF THE INVENTION

In order to help the examiner to understand the technical features, contents, advantages, and effects of the invention, the invention is described in detail with reference to the following description of the preferred embodiments taken in conjunction with the accompanying drawings. The drawings are provided only for the purpose of illustration and assistance in understanding the specification, and may not necessarily reflect the actual proportion and precise arrangement used during the implementation of the invention. Therefore, it should be noted that the proportion and arrangement illustrated in the appended drawings should not be interpreted as limiting the scope of the invention.

Figure 1:
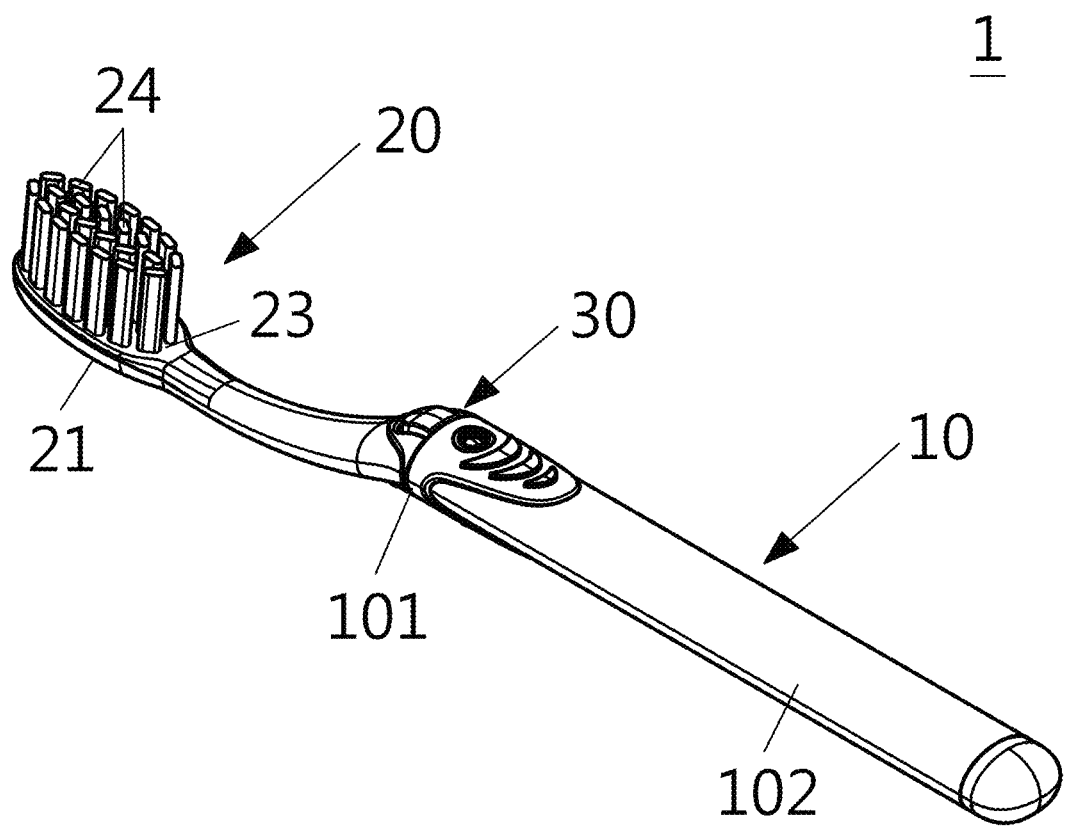
FIG. 1 is a structural perspective view of the toothbrush according to the invention.
Figure 2:
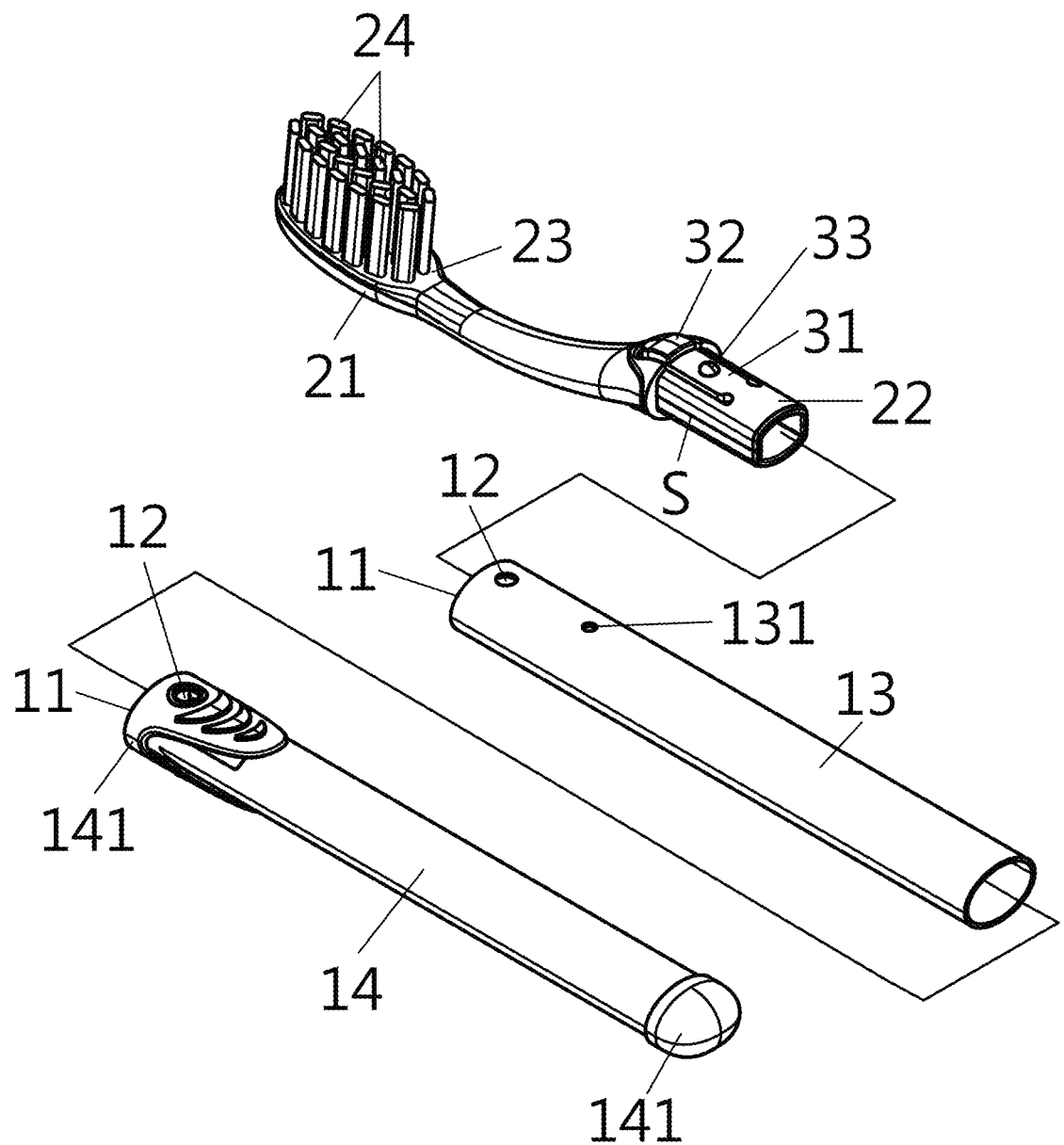
FIG. 2 is a structural exploded view of the toothbrush according to the invention.

FIG. 1 is a structural perspective view of the toothbrush according to the invention, and FIG. 2 shows an exploded view of the toothbrush according to the first embodiment of the invention. The toothbrush 1 herein comprises a handle 10, a brush head 20, and a snap-fit member 30.

Figure 3:
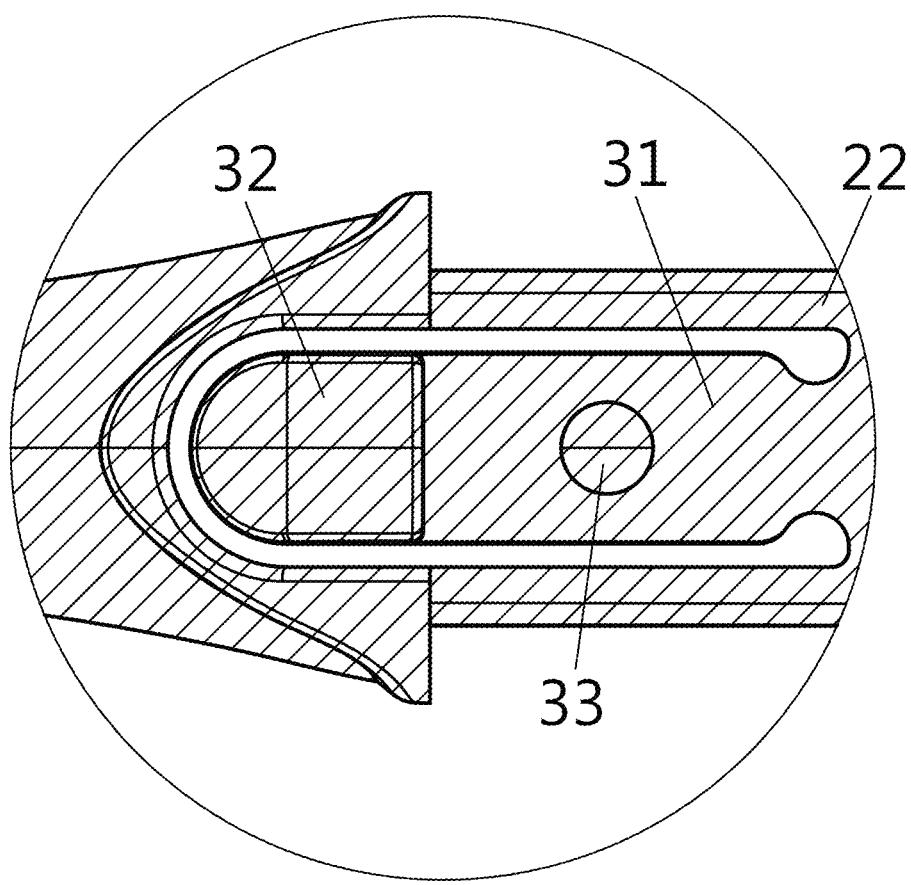
FIG. 3 is a schematic diagram of the toothbrush according to the invention.

The handle 10 comprises a mounting end 101 and a grip end 102. The handle 10 is formed with a socket 11 extending from the mounting end 101 toward the grip end 102 and further formed laterally with a lateral opening 12 which communicates with the socket 11. In the embodiment shown in the drawings, the handle 10 comprises a metal body 13 and a plastic body 14 joined together. The socket 11 is located at a corresponding position of the metal body 13 and the plastic body 14, and the lateral opening 12 is provided laterally on the metal body 13 and the plastic body 14 and communicates with the socket 11. Referring to FIG. 3, it is shown that the metal body 13 is sleeved outside and fixed to the plastic body 14.

The brush head 20 comprises a head portion 21 and an elongated rod 22 connected to the head portion 21. The head portion 21 is formed at one side with a bristle mounting portion 23, on which multiple bundles of bristles 24 are mounted. The elongated rod 22 is adapted for insertion into the socket 11 of the handle.

Figure 4:
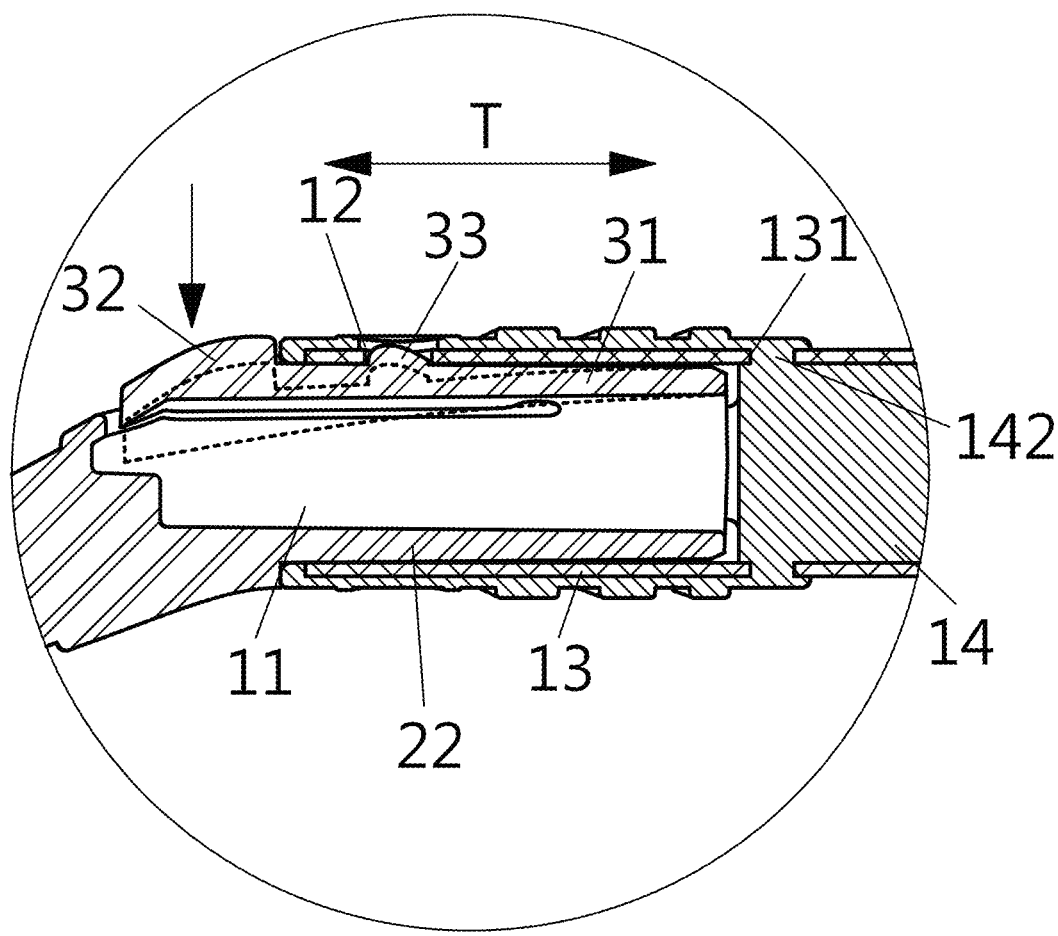
FIG. 4 is a structural cross-sectional view of the toothbrush according to the invention.

The snap-fit member 30 is provided on the elongated rod 22 at the same side as the bristle mounting portion 23 and adapted to be snapped into the lateral opening 12. The snap-fit member 30 comprises a resilient tab 31, a press block 32, and a snap-fit bump 33. The resilient tab 31 is provided on the elongated rod 22 and is connected at one end to the elongated rod 22 with a connecting end 311. The other end of the resilient tab 31 is a free end 312 separated from the elongated rod 22. Referring to FIG. 3, the resilient tab 31 is roughly in form of a rectangular plate and is integrated with the elongated rod 22, with its long sides being parallel to an extending direction in which the elongated rod 22 extends. The resilient tab 31 has one short side which is the connecting end 311, with the other short side and two long sides thereof being separated from the elongated rod 22, so that the tab 31 is made resilient. The pressing block 32 protrudes from the resilient tab 31 and resides at the free end 312, and the snap-fit bump 33 protrudes from the resilient tab 31 and is located between the connecting end 311 and the free end 312. Taking advantage of the resiliency of the tab 31, when the pressing block 32 is pressed to move inwardly toward the elongated rod 22, the snap-fit bump 33 is driven to move inwardly toward the elongated rod 22, as shown in FIG. 4. According to the embodiment shown in the drawings, the snap-fit bump 30 may be provided at the same side as the bristle mounting portion 23 of the elongated rod 22. Alternatively, the snap-fit bump may be provided on the elongated rod at a different side from where the bristle mounting portion resides and, in this case, the lateral opening is correspondingly formed on the handle at the different side from where the bristle mounting portion resides, in a bid to establish a snap-fit engagement with the snap-fit member.

The brush head 20 herein is assembled to the handle 10 by engaging the snap-fit bump 33 of the snap-fit member 30 with the lateral opening 12 of the handle. In the case of replacing the brush head with a new one, the user may simply press the press block 32 to drive the snap-fit bump 33 to move inwardly toward the long rod 22 to disengage it from the lateral opening 12, whereby the brush head 20 is detached from the handle 10. This structural arrangement allows for quick installation of a new brush head to replace the used one without discarding the entire toothbrush, which can be reused and is easy to carry and store.

The metal body 13 and the plastic body 14 are provided therebetween with a first snap-fit module and a second snap-fit module. The first snap-fit module is adapted to prevent the metal body 13 and the plastic body 14 from separating from each other along the extending direction T of the handle 10. According to the embodiments shown in FIGS. 2 and 4, the first snap-fit module comprises stop edges 141 provided at two ends of the plastic body 14 and adapted to position the metal body 13 between the stop edges 141 at the two ends, so that the metal body 13 and the plastic body 14 do not separate from each other along the extending direction T. The second snap-fit module serves to prevent the metal body 13 and the plastic body 14 from rotating relative to each other, wherein the second snap-fit module comprises a through-hole and a positioning pin corresponding thereto. According to the embodiment shown in the drawings, the plastic body 14 is provided with positioning pins 142, whereas the metal body 13 is formed with corresponding through-holes 131 adapted to receive and securing the positioning pins 142, thereby preventing the metal body 13 and the plastic body 14 from rotating relative to each other.

Figure 5:
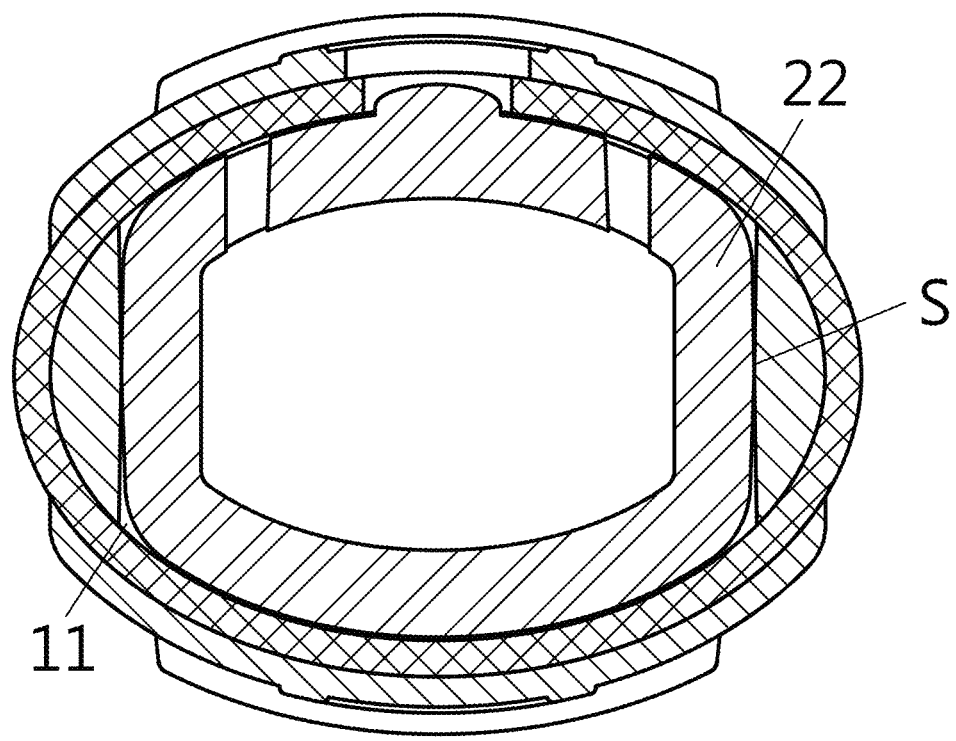
FIG. 5 is another structural cross-sectional view of the toothbrush according to the invention.

Furthermore, as shown in FIG. 2 and FIG. 5, the elongated rod 22 is formed with a flat notch S complementary to the interior contour of the socket 11 of the handle 10, thereby preventing the brush head 20 and the handle 10 from rotating relative to each other.

The plastic body 14 may be fixed to the metal body 13 by injection molding, and the metal body 13 and the plastic body 14 are further prevented from separating from each other by the first and second interlocking modules. Through combining the two different materials, the invention not only can improve the problematic poor mechanical strength of the conventional plastic toothbrushes by addition of the metal material, but can also achieve enhanced aesthetic effects. Alternatively, the handle may be made of a single material, such as metal or plastic material.

The invention provides a feasible toothbrush provided with a detachable brush head. The technical content and technical features of the invention have been disclosed above. However, those skilled in the art may still make various substitutions and modifications without departing from the spirit of the invention based on the disclosure provided herein. Therefore, the scope of protection of the invention should not be limited to those disclosed in the embodiments, and should include various substitutions and modifications without departing from the invention, and is covered by the following claims.

What is claimed is:

1. A toothbrush with a detachable brush head, comprising:
 a handle comprising a mounting end and a grip end, wherein the handle is formed with a socket extending from the mounting end toward the grip end and further formed laterally with a lateral opening which communicates with the socket;
 a brush head comprising a head portion and an elongated rod connected to the head portion, wherein the head portion is formed at one side with a bristle mounting portion and the elongated rod is adapted for insertion into the socket of the handle; and
 a snap-fit member adapted to be snapped into the lateral opening, wherein the snap-fit member comprises a resilient tab, a pressing block and a snap-fit bump, and wherein the resilient tab is provided on the elongated rod and connected at one end to the elongated rod with a connecting end, and the other end of the resilient tab is a free end separated from the elongated rod, and wherein the pressing block protrudes from the resilient tab and resides at the free end, and the snap-fit bump protrudes from the resilient tab and is provided between the connecting end and the free end, wherein the handle comprises a metal body and a plastic body joined together at the socket, and the lateral opening is provided laterally on the metal body and the plastic body and communicates with the socket, and wherein the metal body is sleeved over and fixed to the plastic body.

2. The toothbrush with a detachable brush head according to claim 1, wherein the metal body and the plastic body are provided therebetween with a first snap-fit module and a second snap-fit module, and wherein the first snap-fit module is adapted to prevent the metal body and the plastic body from separating from each other along an extending direction of the handle, and the second snap-fit module serves to prevent the metal body and the plastic body from rotating relative to each other.

3. The toothbrush with a detachable brush head according to claim 2, wherein the first snap-fit module comprises stop edges provided at two ends of the plastic body and adapted to position the metal body between the stop edges at the two ends.

4. The toothbrush with a detachable brush head according to claim 2, wherein the second snap-fit module comprises a through-hole and a positioning pin corresponding thereto.

5. The toothbrush with a detachable brush head according to claim 1, wherein the elongated rod is formed with a flat notch complementary to an interior contour of the socket of the handle, thereby preventing the brush head and the handle from rotating relative to each other.

6. The toothbrush with a detachable brush head according to claim 1, wherein the snap-fit member is provided on the elongated rod at the same side as the bristle mounting portion.

7. The toothbrush with a detachable brush head according to claim 1, wherein the snap-fit bump is provided on the elongated rod at a different side from where the bristle mounting portion resides.

8. The toothbrush with a detachable brush head according to claim 2, wherein the elongated rod is formed with a flat notch complementary to an interior contour of the socket of the handle, thereby preventing the brush head and the handle from rotating relative to each other.

9. The toothbrush with a detachable brush head according to claim 8, wherein the first snap-fit module comprises stop edges provided at two ends of the plastic body and adapted to position the metal body between the stop edges at the two ends.

10. The toothbrush with a detachable brush head according to claim 2, wherein the snap-fit member is provided on the elongated rod at the same side as the bristle mounting portion.

11. The toothbrush with a detachable brush head according to claim 2, wherein the snap-fit bump is provided on the elongated rod at a different side from where the bristle mounting portion resides.

\* \* \* \* \*